(12) United States Patent
Jung et al.

(10) Patent No.: US 12,033,804 B2
(45) Date of Patent: Jul. 9, 2024

(54) MULTILAYER ELECTRONIC COMPONENT

(71) Applicant: SAMSUNG ELECTRO-MECHANICS CO., LTD., Suwon-si (KR)

(72) Inventors: Seo Won Jung, Suwon-si (KR); Won Kuen Oh, Suwon-si (KR); Gyu Ho Yeon, Suwon-si (KR); Seo Ho Lee, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 93 days.

(21) Appl. No.: 17/708,461

(22) Filed: Mar. 30, 2022

(65) Prior Publication Data

US 2023/0215650 A1  Jul. 6, 2023

(30) Foreign Application Priority Data

Dec. 30, 2021  (KR) .......................... 10-2021-0192965

(51) Int. Cl.
*H01G 4/008* (2006.01)
*H01G 4/012* (2006.01)
(Continued)

(52) U.S. Cl.
CPC .............. *H01G 4/30* (2013.01); *H01G 4/008* (2013.01); *H01G 4/012* (2013.01); *H01G 4/12* (2013.01)

(58) Field of Classification Search
CPC ...... H01G 4/008; H01G 4/0085; H01G 4/012; H01G 4/12; H01G 4/1227; H01G 4/232; H01G 4/2325; H01G 4/30; H01G 2/065; H01G 2/06; H01G 4/1209; H01G 4/1218; H01G 4/224; H01G 4/228; H01G 4/236;
(Continued)

(56) References Cited

U.S. PATENT DOCUMENTS 10,825,611 B1 * 11/2020 Fukuoka .................. H01G 4/12
2015/0001998 A1    1/2015 Katsuta et al.
(Continued)

FOREIGN PATENT DOCUMENTS

JP    2003203521 A  *  7/2003  .............. H01B 1/20
JP    2015-029050 A     2/2015
JP    2021-019010 A     2/2021

*Primary Examiner* — Timothy J Thompson
*Assistant Examiner* — Guillermo J Egoavil
(74) *Attorney, Agent, or Firm* — Morgan, Lewis & Bockius LLP (57) ABSTRACT

A multilayer electronic component includes a body including a dielectric layer and a plurality of internal electrodes alternately disposed with the dielectric layer interposed therebetween, and external electrodes disposed on the body, wherein the external electrode include a first electrode layer disposed on two end surfaces and a second electrode layer including a center portion disposed on the first electrode layer and a band portion extending from the center portion onto a portion of a first surface and a portion of a second surface, the first electrode layer includes a conductive metal, the second electrode layer includes silver (Ag) and glass and further includes one or more of palladium (Pd), platinum (Pt), and gold (Au), and ta<tb in which ta is a maximum thickness of the center portion and tb is a maximum thickness of the band portion.

24 Claims, 5 Drawing Sheets

(51) Int. Cl.
*H01G 4/12* (2006.01)
*H01G 4/30* (2006.01)

(58) Field of Classification Search
CPC ........ H01G 4/248; H01G 4/252; H01G 4/385; H01G 4/35
USPC ............ 361/758, 301.4, 306.3, 321.4, 321.2, 361/321.5; 174/260
See application file for complete search history.

(56) References Cited

U.S. PATENT DOCUMENTS

2015/0077898 A1\* 3/2015 Chung ................. H01G 4/30
 427/79
2019/0326058 A1\* 10/2019 Lee .................... H01G 4/232
2021/0210285 A1\* 7/2021 Sasabayashi ........ H01G 4/2325

\* cited by examiner

MULTILAYER ELECTRONIC COMPONENT

CROSS-REFERENCE TO RELATED APPLICATION

This application claims benefit of priority to Korean Patent Application No. 10-2021-0192965 filed on Dec. 30, 2021 in the Korean Intellectual Property Office, the disclosure of which is incorporated herein by reference in its entirety.

BACKGROUND

1. Field

The present disclosure relates to a multilayer electronic component.

2. Description of Related Art

A multilayer ceramic capacitor (MLCC), which is one of the multilayer electronic components, is an important chip component used in industries such as the communications, computing, home appliance, and automobile industries due to advantages thereof, such as having a small size and guaranteeing high capacitance, and in particular, is a key passive element used in various electric, electronic and information communication devices such as mobile phones, computers, and digital TVs.

Conventionally, in order to mount multilayer ceramic capacitors on a substrate, external electrodes of the multilayer ceramic capacitors include a plating layer formed on an electrode layer. However, due to a high-temperature environment, the substrate may be bent and tin (Sn) included in the plating layer may be oxidized during mounting, causing solder cracks or increasing contact resistance.

To solve this problem, an external electrode structure including a first electrode layer containing copper (Cu) and a second electrode layer formed of an electrode containing silver (Ag) and palladium (Pd) has been used. In the case of using such external electrodes, a multilayer ceramic capacitor may be mounted on a substrate using a silver epoxy as a conductive adhesive instead of tin soldering.

In the related art, in such an external electrode structure, a first electrode layer including a conductive metal is disposed on a head surface of a body of a multilayer electronic component, and a second electrode layer including Ag and Pd is formed on the first electrode layer and a portion of the body to improve reliability. In this case, when a thickness of a center portion of the second electrode layer is formed to be thicker than a thickness of a band portion to improve reliability, capacitance per unit volume of the multilayer electronic component may decrease.

Meanwhile, in the process of adjusting the thickness of the center portion and the thickness of the band portion of the second electrode layer, if the thickness of the center portion is insufficient or excessive compared to the thickness of the band portion, moisture resistance reliability, void characteristics and ESR characteristics of the multilayer electronic component may be deteriorated.

Therefore, it is necessary to control correlation between the thickness of the band portion and the thickness of the center portion of the second electrode layer, which may have excellent moisture resistance reliability, void properties, and ESR characteristics, while improving capacitance per unit volume of the multilayer electronic component.

SUMMARY

An aspect of the present disclosure is to solve a problem that capacitance per unit volume of a multilayer electronic component decreases when a thickness of a center portion of a second electrode layer is formed to be thicker than a thickness of the band portion.

An aspect of the present disclosure is also to solve a problem in which moisture resistance reliability, void characteristics, and ESR characteristics of a multilayer electronic component are deteriorated when the thickness of the center portion of the second electrode layer is insufficient or excessive, as compared to the thickness of the band portion.

According to an aspect of the present disclosure, a multilayer electronic component may include: a body including a dielectric layer and a plurality of internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and external electrodes disposed on the body, wherein the external electrodes include a first electrode layer disposed on the third and fourth surfaces and a second electrode layer including a center portion disposed on the first electrode layer and a band portion extending from the center portion onto a portion of the first surface and a portion of the second surface, the first electrode layer includes a conductive metal, the second electrode layer includes silver (Ag) and glass and further includes one or more of palladium (Pd), platinum (Pt), and gold (Au), and ta<tb in which ta is a maximum thickness of the center portion and tb is a maximum thickness of the band portion.

According to another aspect of the present disclosure, a multilayer electronic component may include: a body including a dielectric layer and a plurality of internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and an external electrode including a first electrode layer disposed on the body and connected to the plurality of internal electrodes in the second direction, and a second electrode layer disposed on the first electrode layer, wherein each of the first and second electrode layers includes a center portion disposed on the third or fourth surface of the body and a band portion extending from the center portion onto a portion of the first surface, the first electrode layer includes a conductive metal, the second electrode layer includes silver (Ag) and at least one of palladium (Pd), platinum (Pt), or gold (Au), and ta<tb, wherein to is a maximum thickness of the center portion of the second electrode layer and tb is a maximum thickness of the band portion of the second electrode layer.

According to another aspect of the present disclosure, a multilayer electronic component may include: a body including a dielectric layer and a plurality of internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and external electrodes disposed on the body, wherein the external electrodes each include a first electrode layer disposed on the third or fourth surface and a second electrode layer including a center portion disposed on the first electrode layer and a band portion extending from the center portion onto a portion of the first surface and a portion of the second surface, the second electrode layer is in direct contact with the first electrode layer, the first electrode layer includes Cu, the second electrode layer includes glass and two or more conductive metals, and is free of Ni, and ta<tb, wherein ta is a maximum thickness of the center portion and tb is a maximum thickness of the band portion.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

In the drawings, a first direction may be defined as a stacking direction or thickness (T) direction, a second direction may be defined as a length (L) direction, and a third direction may be defined as a width (W) direction.

Figure 1:
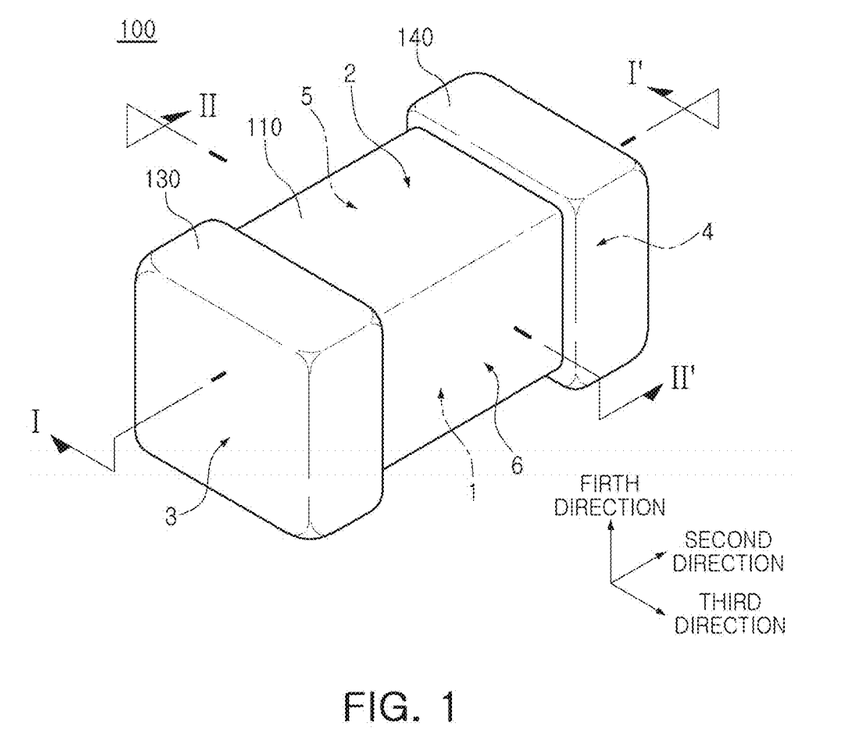
FIG. 1 is a perspective view schematically illustrating a multilayer electronic component according to an exemplary embodiment in the present disclosure.

FIG. 1 is a perspective view schematically illustrating a multilayer electronic component according to an exemplary embodiment in the present disclosure.

Figure 2:
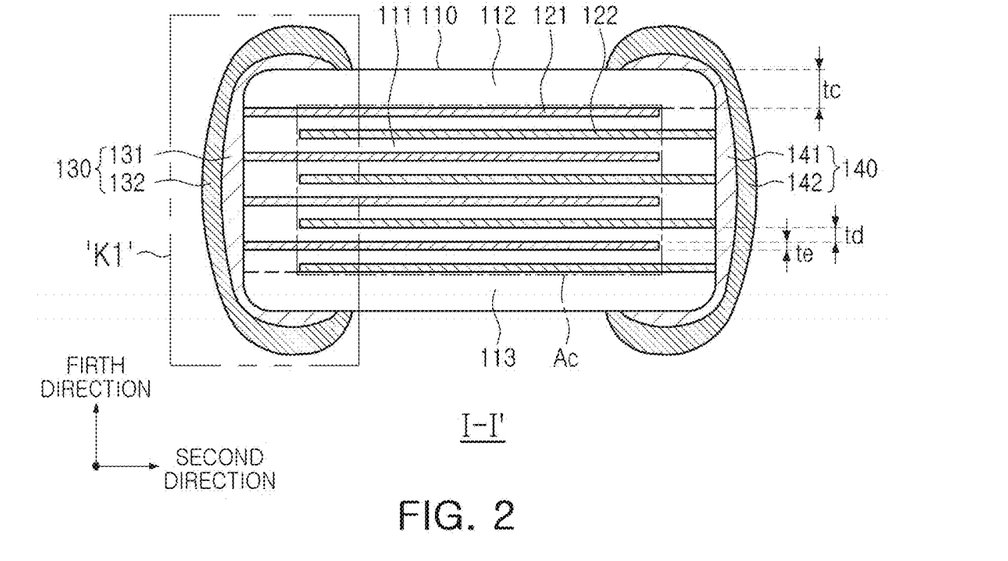
FIG. 2 is a cross-sectional view taken along line I-I' of FIG. 1.

FIG. 2 is a cross-sectional view taken along line I-I' of FIG. 1.

Figure 3:
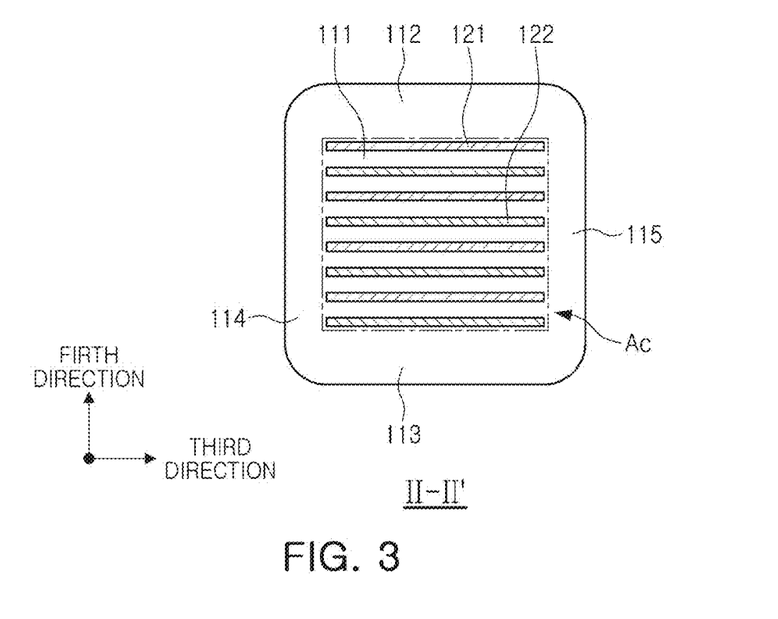
FIG. 3 is a cross-sectional view taken along line II-II' of FIG. 1.

FIG. 3 is a cross-sectional view taken along line II-II' of FIG. 1.

Figure 4:
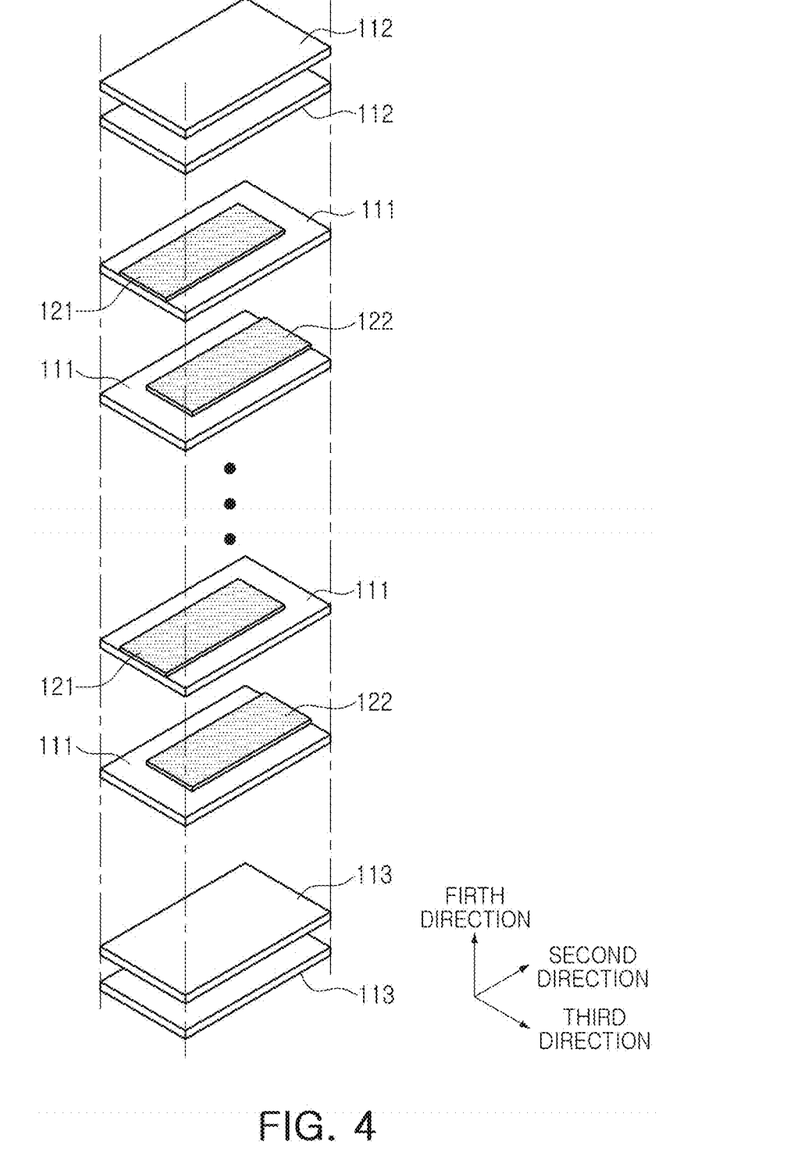
FIG. 4 is an exploded perspective view illustrating a body of a multilayer electronic component according to an exemplary embodiment in the present disclosure.

FIG. 4 is an exploded perspective view illustrating a body of a multilayer electronic component according to an exemplary embodiment in the present disclosure.

In the body 110, a dielectric layer 111 and internal electrodes 121 and 122 are alternately stacked.

There is no particular limitation to a specific shape of the body 110 but, as shown, the body 110 may have a hexahedral shape or a shape similar thereto. Due to contraction (or shrinkage) of ceramic powder particles included in the body 110 during a firing process, the body 110 may have a substantially hexahedral shape, but may not have a hexahedral shape with perfectly straight lines.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a raw material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particles, and the ceramic powder particles may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca or Zr is partially dissolved in $BaTiO_3$ or $BaTiO_3$.

As a material for forming the dielectric layer 111, various ceramic additives, organic solvents, plasticizers, binders, dispersants, etc. may be added to the powder particles such as barium titanate ($BaTiO_3$) according to purposes of the present disclosure.

Meanwhile, an average thickness of the dielectric layer 111 does not need to be particularly limited. For example, an average thickness td of the dielectric layer 111 may be 0.2 μm or more and 2 μm or less.

However, in general, when the dielectric layer is formed to be thin to have a thickness less than 0.6 μm, particularly, when the thickness of the dielectric layer is 0.35 μm or less, reliability may be lowered.

According to an exemplary embodiment in the present disclosure, since reliability may be improved by adjusting the maximum thickness of the band portion and the center portion of the second electrode layers 132 and 142, the effect of improving reliability according to the present inventive concept may be more remarkable when the average thickness of the dielectric layer 111 is 0.35 μm or less.

The average thickness of the dielectric layer 111 may refer to an average thickness of the dielectric layer 111 disposed between the first and second internal electrodes 121 and 122.

The average thickness of the dielectric layer 111 may be measured by scanning an image of a cross-section of the body 110 in a length-thickness direction (L-T) with a scanning electron microscope (SEM) having a magnification of 10,000. More specifically, an average value may be measured by measuring a thickness of one dielectric layer at 30 points at equal intervals in a length direction in the scanned image. The 30 points at equal intervals may be designated in the capacitance forming portion Ac. In addition, if the average value is measured by extending the measurement of the average value to 10 dielectric layers, the average thickness of the dielectric layer may be further generalized.

The body 110 may include a capacitance forming portion Ac disposed inside the body 110 and forming capacitance by including the plurality of internal electrodes 121 and 122 alternately disposed with the dielectric layer 111 and cover portions 112 and 113 formed on upper and lower surfaces of the capacitance forming portion Ac in the first direction.

In addition, the capacitance forming portion Ac is a portion contributing to capacitance formation of the capacitor, and may be formed by repeatedly stacking the plurality of first and second internal electrodes 121 and 122 with the dielectric layer 111 interposed therebetween.

The cover portions 112 and 113 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer or two or more dielectric layers on upper and lower surfaces of the capacitance forming portion Ac in the thickness direction, respectively, and may serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, an average thickness of the cover portions 112 and 113 may not be particularly limited. However, the average thickness of the cover portions 112 and 113 may be 15 μm or less in order to more easily achieve miniaturization and high capacitance in the multilayer electronic component. According to an exemplary embodiment in the present disclosure, since reliability may be improved by adjusting the maximum thickness of the band portion and the center portion of the second electrode layers 132 and 142, the reliability of the multilayer electronic component may be improved, even when the average thickness of the cover portion is 15 μm or less.

The average thickness of the cover portions 112 and 113 may refer to a size in the first direction and may be a value obtained by averaging sizes of the cover portions 112 and 113 in the first direction measured at five points at equal intervals above or below the capacitance forming portion Ac.

In addition, margin portions 114 and 115 may be disposed on a side surface of the capacitance forming portion Ac.

The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on both end surfaces of the ceramic body 110 in the width direction.

As shown in FIG. 3, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or more dielectric layers on both side surfaces of the capacitance forming portion Ac in the third direction (the width direction).

Meanwhile, the widths of the margin portions 114 and 115 do not need to be particularly limited. However, the average width of the margin portions 114 and 115 may be 15 μm or less in order to more easily achieve miniaturization and high capacitance of the multilayer electronic component. According to an exemplary embodiment in the present disclosure, since reliability may be improved by adjusting the maximum thickness of the band portion and the center portion of the second electrode layers 132 and 142, the reliability may be improved even when the average width of the margin portions 114 and 115 is 15 μm or less.

The average width of the margin portions 114 and 115 may refer to an average size of the margin portions 114 and 115 in the third direction, and may be a value obtained by averaging sizes of the margin portions 114 and 115 measured at five points at equal intervals in the third direction on a side surface of the capacitance forming portion Ac.

The plurality of internal electrodes 121 and 122 may be alternately disposed with the dielectric layer 111.

The plurality of internal electrodes 121 and 122 may include first and second internal electrodes 121 and 122. The first and second internal electrodes 121 and 122 are alternately disposed to face each other with the dielectric layer 111 constituting the body 110 interposed therebetween and may be connected to the third and fourth surfaces 3 and 4 of the body 110, respectively.

Specifically, one end of the first internal electrode 121 may be connected to the third surface, and one end of the second internal electrode 122 may be connected to the fourth surface.

The first internal electrode 121 may be spaced apart from the fourth surface 4 and exposed through the third surface 3, and the second internal electrode 122 may be spaced apart from the third surface 3 and exposed through the fourth surface 4. The first external electrode 130 may be disposed on the third surface 3 of the body to be connected to the first internal electrode 121, and the second external electrode 140 may be disposed on the fourth surface 4 of the body to be connected to the second internal electrode 122.

That is, the first internal electrode 121 is not connected to the second external electrode 140 but is connected to the first external electrode 130, and the second internal electrode 122 is not connected to the first external electrode 130 but is connected to the second external electrode 140. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately stacking a ceramic green sheet on which the first internal electrode 121 is printed and a ceramic green sheet on which the second internal electrode 122 is printed and subsequently firing the green sheets.

A material for forming the internal electrodes 121 and 122 is not particularly limited, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. As a printing method of the conductive paste for internal electrodes, a screen printing method or a gravure printing method may be used but the present disclosure is not limited thereto.

In an exemplary embodiment, the internal electrodes 121 and 122 may include Ni. In this case, an alloy may be formed with copper (Cu) included in the first electrode layers 131 and 141 of the present disclosure, which will be described later, or electrical connectivity may be improved through metal bonding.

In addition, the average thickness of the internal electrodes 121 and 122 does not need to be particularly limited. For example, the average thickness of the internal electrodes 121 and 122 may be 0.2 μm or more and 2 μm or less.

However, in general, when the internal electrode is formed to be thinner to have a thickness less than 0.6 μm, in particular, when the thickness of the internal electrode is 0.35 μm or less, reliability may be deteriorated.

According to an exemplary embodiment in the present disclosure, since the reliability is improved by adjusting the maximum thickness of the band portion and the center portion, the effect according to the present disclosure may be more remarkable and miniaturization and high capacitance of the multilayer electronic component may be more easily achieved when the internal electrodes 121 and 122 have an average thickness of 0.35 μm or less.

The average thickness to of the internal electrodes 121 and 122 may refer to an average thickness of the internal electrodes 121 and 122.

The average thickness of the internal electrodes 121 and 122 may be measured by scanning an image of a cross-section of the body 110 in the length-thickness direction (L-T) with a scanning electron microscope (SEM) having a magnification of 10,000. More specifically, the average thickness of the internal electrodes may correspond to an average size in the first direction obtained by measuring one internal electrode in a scanned image at 30 points at equal intervals in the length direction. The 30 points at equal intervals may be designated in the capacitance forming portion Ac. In addition, if the average value is measured by extending the measurement of the average value to 10 internal electrodes, the average thickness of the internal electrodes may be further generalized.

The external electrodes 130 and 140 may be disposed on the third surface 3 and the fourth surface 4 of the body 110. The external electrodes 130 and 140 may include first and second external electrodes 130 and 140 disposed on the third and fourth surfaces 3 and 4 of the body 110, respectively, and connected to the first and second internal electrodes 121 and 122, respectively.

In the present exemplary embodiment, a structure in which the multilayer electronic component 100 has two external electrodes 130 and 140 is described, but the number or shape of the external electrodes 130 and 140 may be modified according to shapes of the internal electrodes 121 and 122 or other purposes.

The external electrodes 130 and 140 may include first electrode layers 131 and 141 disposed on the third and fourth surfaces of the body 110 and including a conductive metal, respectively.

The first electrode layers 131 and 141 may be disposed on the third and fourth surfaces of the body and include a conductive metal to secure electrical connectivity with the internal electrodes. That is, the first electrode layers 131 and 141 are in contact with and directly connected to the first and second internal electrodes 121 and 122 alternately connected to the third and fourth surfaces of the body 110 through one surface of the body 110 in the second direction, thereby securing electrical conduction between the first and second external electrodes 130 and 140 and the first and second internal electrodes.

The first electrode layers 131 and 141 may be disposed on the third surface and the fourth surface of the body and may extend to portions of the first surface and the second surface to improve bonding strength between the external electrodes 130 and 140 and the body 110. However, extending to the portions of the first surface and the second surface is not essential in the present disclosure. That is, the first electrode layer may be disposed only on the third surface and fourth surface to reduce a proportion occupied by the external electrodes 130 and 140.

A type of the conductive metal included in the first electrode layers 131 and 141 is not particularly limited. The conductive metal may include the same metal as that included in the first and second internal electrodes 121 and 122 to improve electrical connectivity, and may include a metal forming an alloy with the metal included in the first and second internal electrodes 121 and 122.

In an exemplary embodiment, the conductive metal included in the first electrode layers 131 and 141 may include copper (Cu). Accordingly, when the first and second internal electrodes 121 and 122 include nickel (Ni), a nickel (Ni)-copper (Cu) alloy may be formed to further improve electrical connectivity.

The first electrode layer may be formed by applying a paste including conductive metal powder and glass on the body and then firing. A method of applying the paste on the body is not particularly limited. For example, the surface on which the first and second internal electrodes are exposed may be dipped into the paste or an electrode sheet may be transferred to the corresponding surface to be formed.

Accordingly, in an exemplary embodiment, the first electrode layers 131 and 141 may further include glass in addition to the conductive metal. Accordingly, a bonding strength between the first electrode layers 131 and 141 and the body 110 may be improved.

The second electrode layers 132 and 142 may be disposed on the first electrode layer and may include silver (Ag) and, in addition, palladium (Pd).

The second electrode layer may serve to prevent oxidation and prevent penetration of moisture and hydrogen. In addition, since the second electrode layer includes silver (Ag), mounting may be performed on the substrate by a conductive adhesive including silver (Ag) and resin without a solder including tin (Sn).

Accordingly, a problem of solder cracks occurring due to stress due to a difference in thermal expansion coefficient between the external electrodes and the solder in a high temperature-low temperature cycle.

Meanwhile, when the second electrode layer includes only silver (Ag) or the content of silver (Ag) is increased, ion migration may occur.

Accordingly, the second electrode layers 132 and 142 may further contain palladium (Pd) to suppress the occurrence of ion migration, and palladium (Pd) may be replaced or mixed with another metal capable of preventing ion migration, such as platinum (Pt) or gold (Au), etc.

The second electrode layers 132 and 142 may be disposed on the first electrode layers disposed on the third and fourth surfaces, and may be disposed to extend on a portion of the first surface, the second surface, the fifth surface, and the sixth surface of the body 110. Accordingly, the moisture resistance reliability of the multilayer electronic component 100 may be improved and flexural strength may be improved so that the multilayer electronic component 100 may be protected from external bending stress when mounted on a substrate.

In an exemplary embodiment, the second electrode layers 132 and 142 may further include glass. Glass may control a sintering rate of silver (Ag) and palladium (Pd) metals when forming the second electrode layers 132 and 142 by applying and firing a paste, reduce stress applied to the body 110 during sintering, and secure adhesion to the substrate.

The glass component may have a composition in which oxides are mixed, and may be one or more selected from the group consisting of silicon oxide, boron oxide, aluminum oxide, transition metal oxide, alkali metal oxide, and alkaline earth metal oxide but is not particularly limited. The transition metal may be one or more selected from the group consisting of zinc (Zn), titanium (Ti), vanadium (V), manganese (Mn), iron (Fe), and nickel (Ni), the alkali metal may be one or more selected from the group consisting of lithium (Li), sodium (Na), and potassium (K), and the alkaline earth metal may be one or more selected from the group consisting of magnesium (Mg), calcium (Ca), strontium (Sr), and barium (Ba).

The second electrode layers 132 and 142 may be formed by applying a conductive paste including silver (Ag) particles, further including one or more of palladium (Pd) particles, platinum (Pt) particles, and gold (Au) particles, and in addition, glass to a portion of the body and the first electrode layers 131 and 132 and then performing firing. In this case, the first electrode layer and the second electrode layer may be simultaneously fired, but are not limited thereto.

The second electrode layer may be a portion in direct contact with the conductive adhesive to be mounted on a substrate by a conductive adhesive including (Ag) and resin. Meanwhile, since the second electrode layer includes silver (Ag) and glass and additionally includes noble metals such as palladium (Pd), platinum (Pt), and gold (Au), copper (Cu) in the first electrode layer may be easily diffused into the second electrode layer.

As such, Cu diffused into the second electrode layer may be exposed to an outer surface of the second electrode layer and may be easily oxidized in an operating environment of the multilayer electronic component, which may cause deterioration of the reliability of the multilayer electronic component. Accordingly, an attempt has been made to solve this problem by increasing the thickness of the center portion rather than the thickness of the band portion of the second electrode layer.

However, when the maximum thickness of the center portion is excessively greater than the maximum thickness of the band portion of the second electrode layer, the proportion of the external electrode cannot be reduced, so there is a problem in that capacitance per unit volume of the multilayer electronic component is reduced.

Accordingly, in the present disclosure, the maximum thickness of the band portion of the second electrode layer is increased to be larger than the maximum thickness of the center portion, thereby improving the capacitance per unit volume of the multilayer electronic component, while the ESR characteristics, void characteristics, and moisture resistance reliability are improved by adjusting correlation between the maximum thickness of the band portion and the maximum thickness of the center portion.

Figure 5:
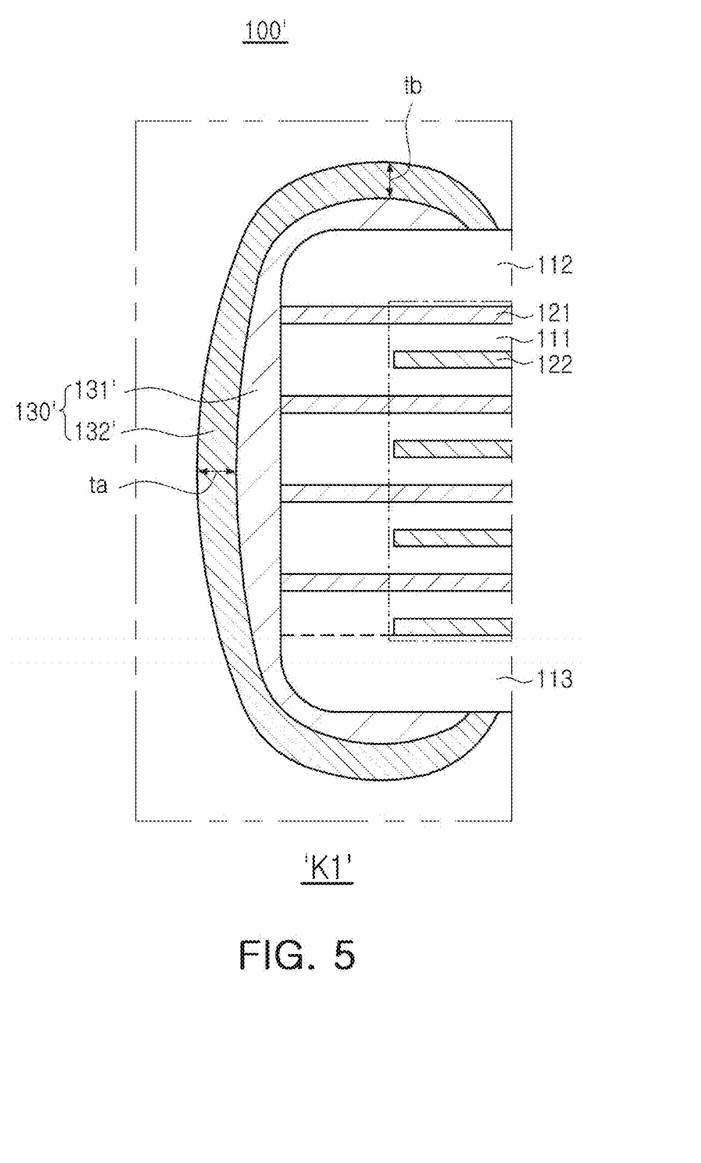
FIG. 5 is an enlarged view of the Comparative Example corresponding to a region K1 of FIG. 2.

FIG. 5 is an enlarged view of a multilayer electronic component 100' according to Comparative Example corresponding to region K1 of FIG. 2.

Referring to FIG. 5, an external electrode 130' of the multilayer electronic component 100' according to Comparative Example includes a first electrode layer 131' disposed on the third surface of the body and a second electrode layer 132' including a center portion disposed on the first electrode layer and a band portion extending from the center portion onto a portion of the first surface and a portion of the second surface, wherein a maximum thickness to of the center portion of the second electrode layer is greater than a maximum thickness tb of the band portion.

Accordingly, since the proportion of the external electrode 130' in the multilayer electronic component 100' is large, it is impossible to maximize the proportion occupied by the capacitance forming portion, so that the capacitance per unit volume of the multilayer electronic component may not be improved.

Figure 6:
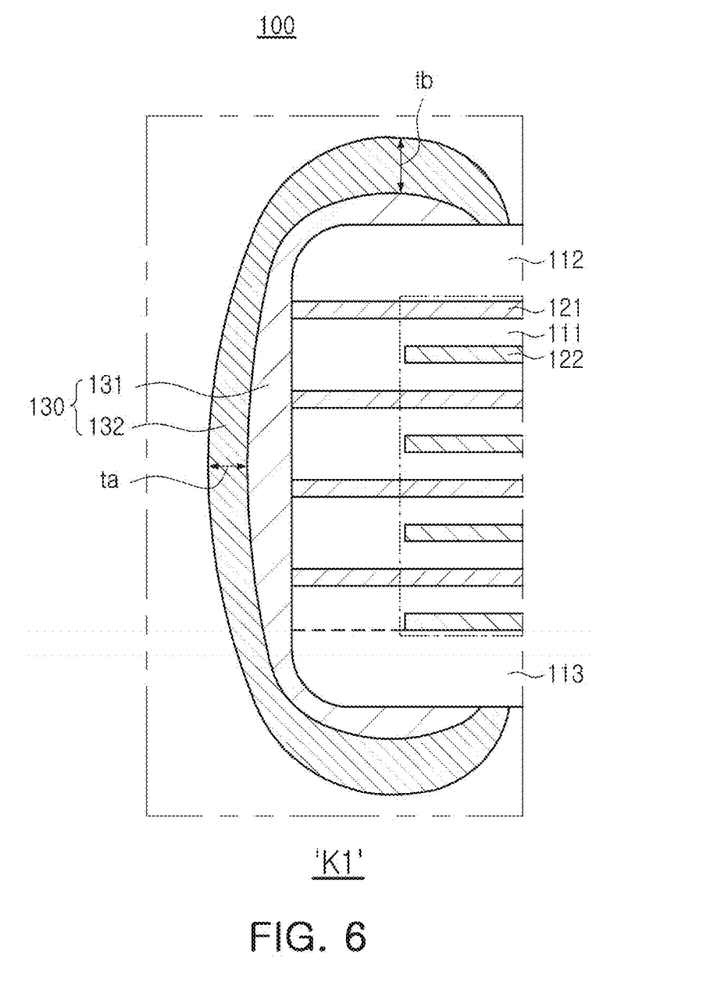
FIG. 6 is an enlarged view of a multilayer electronic component according to an exemplary embodiment in the present disclosure for a region K1 of FIG. 2.

FIG. 6 is an enlarged view of the multilayer electronic component 100 according to an exemplary embodiment in the present disclosure with respect to the region K1 of FIG. 2.

The second electrode layers 132 and 142 of the multilayer electronic component 100 according to an exemplary embodiment in the present disclosure may include a center portion disposed on the first electrode layers 131 and 141 and a band portion extending from the center portion onto portions of the first surface and the second surface, and when a maximum thickness of the center portion is to and a maximum thickness of the band portion is tb, ta<tb may be satisfied.

Accordingly, by reducing the proportion of the external electrodes 130 and 140 in the multilayer electronic component 100, the proportion occupied by the capacitor forming part Ac may be maximized, thereby improving the capacitance per unit volume of the multilayer electronic component 100.

In an exemplary embodiment, 0.25≤ta/tb<0.45 may be satisfied.

If ta/tb is less than 0.25, the maximum thickness of the center portion may not be sufficiently large compared to the maximum thickness of the band portion, and thus, Cu included in the first electrode layer may diffuse into the second electrode layer to be exposed to a surface of the second electrode layer, and an oxide may be formed, so the moisture resistance reliability may not be improved.

If ta/tb is 0.45 or greater, the maximum thickness of the center portion may be excessively large compared to the maximum thickness of the band portion, and thus, the void characteristic and ESR characteristic may be deteriorated, and in addition, the volume occupied by the external electrodes 130 and 140 may not be minimized, so it may be difficult to improve the capacitance per unit volume of the multilayer electronic component.

Therefore, in an exemplary embodiment, ta and tb satisfy 0.25≤ta/tb<0.45, so that the maximum thickness of the center portion is adjusted to an appropriate value compared to the maximum thickness of the band portion, thereby improving moisture resistance reliability, void characteristics, and ESR characteristics, and since the maximum thickness of the center portion is not excessively increased, the capacitance per unit volume of the multilayer electronic component 100 may also be improved.

In an exemplary embodiment, 10 µm≤ta<18 µm may be satisfied.

if ta is less than 10 µm, the maximum thickness of the center portion may not be sufficient to suppress diffusion of Cu that may be included in the first electrode layer to the surface of the second electrode layer, and thus it may be difficult to improve moisture resistance reliability.

If ta is 18 μm or more, the maximum thickness of the center portion may be excessively thick, so that the proportion of the external electrodes 130 and 140 may not be reduced, so that the capacitance per unit volume of the multilayer electronic component 100 may not be improved, and the void characteristics and ESR characteristics may not be improved.

Therefore, according to an exemplary embodiment, the moisture resistance reliability, the void characteristics, and the ESR characteristics may be improved by adjusting the maximum thickness of the center portion to satisfy 10 μm≤ta<18 μm, and since the maximum thickness of the center portion is not increased excessively, the capacitance per unit volume of the multilayer electronic component 100 may also be improved.

Meanwhile, the maximum thickness of the center portion and the band portion of the second electrode layer may be measured using an optical microscope or a scanning electron microscope (SEM). Specifically, the maximum thickness to of the center portion of the second electrode layer may be a value measured at a point at which the second electrode layer disposed on the third and fourth surfaces has the maximum thickness in the cross-section of the multilayer electronic component in the length and thickness directions, and the maximum thickness tb of the band portion of the second electrode layer may be a value measured at a point at which the second electrode layer disposed to extend to portions of the first surface and the second surface has the maximum thickness.

In an exemplary embodiment, outer surfaces of the second electrode layers 132 and 142 may not include Cu.

As described above, the second electrode layers 132 and 142 directly contact the conductive adhesive to allow the multilayer electronic component 100 to be mounted on the substrate.

When the first electrode layers 131 and 141 include copper (Cu), copper (Cu) may diffuse into the second electrode layers 132 and 142, and if the second electrode layer does not have a sufficient thickness, copper (Cu) may be exposed as an outer surface of the second electrode layer. Copper (Cu) exposed to the outer surface of the second electrode layer may be easily oxidized in the air or in the operating environment of the multilayer electronic component 100, thereby becoming vulnerable to moisture penetration.

According to an exemplary embodiment in the present disclosure, since 0.25≤ta/tb<0.45 is satisfied, the center portion of the second electrode layer may have a sufficient thickness, thereby suppressing a phenomenon in which Cu of the first electrode layer is diffused to the outer surface of the second electrode layer. In addition, since 10 μm≤ta≤18 μm is satisfied, a phenomenon in which Cu of the electrode layer is diffused to the outer surface of the second electrode layer may be suppressed. Accordingly, the outer surfaces of the second electrode layers 132 and 142 of the multilayer electronic component according to an exemplary embodiment may not include copper (Cu) and may not include an oxide including copper (Cu).

In an exemplary embodiment, the second electrode layers 132 and 142 may not include Ni.

In general, the multilayer electronic component mounted on a substrate through Sn solder undergoes a solder reflow process, and cracks may occur due to a difference in thermal expansion coefficient between the external electrodes and the solder. Accordingly, attempts have been made to solve this problem by forming a Ni plating layer on the external electrodes or allowing the external electrodes to include an alloy including Ni.

Meanwhile, in the present disclosure, since the second electrode layers 132 and 142 include Ag, the multilayer electronic component may be mounted on the substrate through a conductive adhesive such as Ag epoxy instead of Sn solder, so that the problem in which solder cracks occur may be solved although a Ni plating layer is not formed on the second electrode layer or the second electrode layer does not include a Ni alloy.

Meanwhile, the components of the first electrode layers 131 and 141 and the second electrode layers 132 and 142 may be calculated from an image observed using a scanning electron microscope-energy dispersive X-ray spectroscopy (SEM-EDS). Specifically, the multilayer electronic component may be polished to a position of the center in the width direction (the third direction) to expose a cross-section in the length direction and thickness direction (L-T cross-section), the first and second electrode layers are equally divided into five regions in the thickness direction, and components, at %, and wt % of each element included in the first and second electrode layers in a region disposed at the center may be measured using an EDS.

A size of the multilayer electronic component 100 does not need to be particularly limited.

However, in order to achieve miniaturization and high capacitance at the same time, it is necessary to increase the number of stacked layers by reducing the thickness of the dielectric layer and the internal electrodes, and therefore, the effect of improving reliability according to the present disclosure may be more remarkable in the multilayer electronic component 100 having a size of 0603 (length×width, 0.6 mm×0.3 mm) or less.

Accordingly, in consideration of manufacturing errors and a size of the external electrode, the effect of improving adhesion strength according to the present disclosure may be more remarkable when the length of the multilayer electronic component 100 is 0.66 mm or less and the width is 0.33 mm or less. Here, the length of the multilayer electronic component 100 may refer to the maximum size of the multilayer electronic component 100 in the second direction, and the width of the multilayer electronic component 100 may refer to the maximum size of the multilayer electronic component 100 in the third direction.

Example

Table 1 below shows the measurement and evaluation of moisture resistance reliability, void characteristics, and ESR characteristics by adjusting the ratio of the maximum thickness ta of the center portion and the maximum thickness tb of the band portion of the first electrode layer.

The evaluation and test were conducted by manufacturing a multilayer electronic component sample having a length× width (L×W) of about (3.2 mm±0.1 mm)×(2.5 mm±0.1 mm), and the maximum thickness ta of the center portion of the second electrode layer was measured at a point at which the second electrode layer disposed on the third and fourth surfaces had the maximum thickness in the cross section of the multilayer electronic component in the length and thickness directions, and the maximum thickness tb of the band portion of the second electrode layer was measured at a point at which the second electrode layer disposed to extend to portions of the first and second surfaces has a maximum thickness.

For evaluation of the moisture resistance reliability, a case in which a short-circuit occurred by applying a voltage of 1 to 1.5 V for 15 to 30 hours in an environment of a temperature of 85° C. and a relative humidity of 85% was determined as defective, and a case in which three or more of 100 samples were defective was marked as NG and a case in which less than three samples were defective was marked as OK.

For the void characteristics of the second electrode layer, the multilayer electronic component was erected such that the third and fourth surfaces of the body face the ground and the outer surface of the second electrode layer was observed with an optical microscope. A case in which void was observed was determined as defective, and a case in which ten or more of 100 samples were defective was marked as NG, while a case in which less than ten samples were defective was marked as OK.

For the ESR characteristics, a case in which the ESR value measured by applying a voltage having a frequency of 500 kHz and 1 V was 100 mΩ or more was determined as defective, and a case in which two or more of 100 samples were defective was marked as NG and a case in which less than two samples were defective was marked as OK.

TABLE 1

| Test number | ta (μm) | tb (μm) | ta/tb | Moisture resistance reliability (number of defective samples/number of samples) | Void characteristics (number of defective samples/number of samples) | ESR characteristics (number of defective samples/number of samples) |
|---|---|---|---|---|---|---|
| 1 | 8 | 40 | 0.20 | NG (4/100) | OK (00/100) | OK (00/100) |
| 2 | 10 | 40 | 0.25 | OK (00/100) | OK (00/100) | OK (00/100) |
| 3 | 12 | 40 | 0.30 | OK (00/100) | OK (00/100) | OK (00/100) |
| 4 | 14 | 40 | 0.35 | OK (00/100) | OK (00/100) | OK (00/100) |
| 5 | 16 | 40 | 0.40 | OK (00/100) | OK (00/100) | OK (00/100) |
| 6 | 18 | 40 | 0.45 | OK (00/100) | NG (12/100) | NG (2/100) |
| 7 | 20 | 40 | 0.50 | OK (00/100) | NG (20/100) | NG (5/100) |

In the case of Test number 1, ta/tb was less than 0.25, and it can be seen that, since the maximum thickness of the center portion of the second electrode layer was thinner than the maximum thickness of the band portion, the void and ESR characteristics were excellent, but the maximum thickness of the center portion was not sufficient, so the moisture resistance reliability was not improved.

In the case of Test numbers 6 and 7, ta/tb is 0.45 or more, and it can be seen that, since the maximum thickness of the center portion of the second electrode layer was excessively thick compared to the maximum thickness of the band portion, void and ESR characteristics were poor.

Test numbers 2 to 5 are cases in which ta/tb is 0.25 or more and less than 0.45, and it can be seen that, since the thickness of the center portion of the second electrode layer has an appropriate size compared to the thickness of the band portion, moisture resistance reliability, void characteristics and ESR characteristics were excellent.

In the present disclosure, the moisture resistance reliability, void characteristics, and ESR characteristics of the multilayer electronic component may be improved by adjusting ta/tb to satisfy 0.25 or more and less than 0.45.

One of the various effects of the present disclosure is to improve the capacitance per unit volume of the multilayer electronic component by disposing the maximum thickness of the band portion of the second electrode layer to be thicker than the maximum thickness of the center portion.

One of the various effects of the present disclosure is to improve the moisture resistance reliability, void characteristics, and ESR characteristics by adjusting the correlation between the maximum thickness of the center portion of the second electrode layer and the maximum thickness of the band portion.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
   a body including a dielectric layer and a plurality of internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and
   external electrodes disposed on the body,
   wherein the external electrodes each include a first electrode layer disposed on the third or fourth surface and a second electrode layer including a center portion disposed on the first electrode layer and a band portion extending from the center portion onto a portion of the first surface and a portion of the second surface,
   the first electrode layer includes a conductive metal,
   the second electrode layer includes silver (Ag) and glass and further includes one or more of palladium (Pd), platinum (Pt), or gold (Au),
   ta<tb, wherein ta is a maximum thickness of the center portion and tb is a maximum thickness of the band portion, and
   0.25≤ta/tb<0.45 is satisfied.

2. The multilayer electronic component of claim 1, wherein 10 μm≤ta<18 μm is satisfied.

3. The multilayer electronic component of claim 1, wherein an outer surface of the second electrode layer does not include Cu.

4. The multilayer electronic component of claim 2, wherein an outer surface of the second electrode layer does not include Cu.

5. The multilayer electronic component of claim 1, wherein the conductive metal includes Cu.

6. The multilayer electronic component of claim 5, wherein an outer surface of the second electrode layer does not include Cu.

7. The multilayer electronic component of claim 1, wherein the first electrode layer further includes glass.

8. The multilayer electronic component of claim 1, wherein the second electrode layer does not include Ni.

9. The multilayer electronic component of claim 1, wherein an average thickness of the dielectric layer is 0.35 lam or less.

10. The multilayer electronic component of claim 1, wherein an average thickness of the internal electrode is 0.35 lam or less.

11. The multilayer electronic component of claim 1, wherein:
the body includes a capacitance forming portion forming capacitance by including the plurality of internal electrodes alternately disposed with the dielectric layer interposed therebetween, the body further including a cover portion disposed on upper and lower surfaces of the capacitance forming portion in the first direction, and
an average thickness of the cover portion is 15 µm or less.

12. A multilayer electronic component comprising:
a body including a dielectric layer and a plurality of internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and
an external electrode including a first electrode layer disposed on the body and connected to the plurality of internal electrodes in the second direction, and a second electrode layer disposed on the first electrode layer,
wherein each of the first and second electrode layers includes a center portion disposed on the third or fourth surface of the body and a band portion extending from the center portion onto a portion of the first surface,
the first electrode layer includes a conductive metal,
the second electrode layer includes silver (Ag) and at least one of palladium (Pd), platinum (Pt), or gold (Au),
ta<tb, wherein ta is a maximum thickness of the center portion of the second electrode layer and tb is a maximum thickness of the band portion of the second electrode layer, and
0.25≤ta/tb<0.45 is satisfied.

13. The multilayer electronic component of claim 12, wherein the second electrode layer further includes glass.

14. The multilayer electronic component of claim 12, wherein 10 µm≤ta<18 µm is satisfied.

15. The multilayer electronic component of claim 12, wherein the conductive metal includes Cu.

16. The multilayer electronic component of claim 15, wherein an outer surface of the second electrode layer does not include Cu.

17. The multilayer electronic component of claim 12, wherein the second electrode layer does not include Ni.

18. A multilayer electronic component comprising:
a body including a dielectric layer and a plurality of internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and
external electrodes disposed on the body,
wherein the external electrodes each include a first electrode layer disposed on the third or fourth surface and a second electrode layer including a center portion disposed on the first electrode layer and a band portion extending from the center portion onto a portion of the first surface and a portion of the second surface,
the second electrode layer is in direct contact with the first electrode layer,
the first electrode layer includes Cu,
the second electrode layer includes glass and two or more conductive metals, and is free of Ni,
ta<tb, wherein ta is a maximum thickness of the center portion and tb is a maximum thickness of the band portion, and
0.25≤ta/tb<0.45 is satisfied.

19. The multilayer electronic component of claim 18, wherein the two or more conductive metals included in the second electrode layer comprise silver (Ag) and at least one of palladium (Pd), platinum (Pt), or gold (Au).

20. The multilayer electronic component of claim 18, wherein 10 µm≤ta<18 µm is satisfied.

21. The multilayer electronic component of claim 18, wherein an outer surface of the second electrode layer is free of Cu.

22. A multilayer electronic component comprising:
a body including a dielectric layer and a plurality of internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and
external electrodes disposed on the body,
wherein the external electrodes each include a first electrode layer disposed on the third or fourth surface and a second electrode layer including a center portion disposed on the first electrode layer and a band portion extending from the center portion onto a portion of the first surface and a portion of the second surface,
the first electrode layer includes a conductive metal,
the second electrode layer includes silver (Ag) and glass and further includes one or more of palladium (Pd), platinum (Pt), or gold (Au),
ta<tb, wherein ta is a maximum thickness of the center portion and tb is a maximum thickness of the band portion, and
10 µm≤ta<18 µm is satisfied.

23. The multilayer electronic component of claim 22, wherein an outer surface of the second electrode layer does not include Cu.

24. The multilayer electronic component of claim 22, wherein the conductive metal includes Cu.

* * * * *